(12) United States Patent
Inui et al.

(10) Patent No.: US 7,799,963 B2
(45) Date of Patent: Sep. 21, 2010

(54) CRACKING TUBE HAVING HELICAL FINS

(75) Inventors: Masahiro Inui, Takarazuka (JP); Kaoru Hamada, Sanda (JP); Kenji Otsubo, Neyagawa (JP)

(73) Assignee: Kubota Corporation, Osaka-shi (JP)

( * ) Notice: Subject to any disclaimer, the term of this patent is extended or adjusted under 35 U.S.C. 154(b) by 0 days.

(21) Appl. No.: 12/379,845

(22) Filed: Mar. 3, 2009

(65) Prior Publication Data

US 2009/0177022 A1    Jul. 9, 2009

Related U.S. Application Data

(60) Division of application No. 10/534,016, filed on May 5, 2005, now abandoned, which is a continuation of application No. PCT/JP03/14403, filed on Nov. 12, 2003.

(30) Foreign Application Priority Data

Nov. 15, 2002    (JP)    ............................. 2002-332257

(51) Int. Cl.
C07C 4/04    (2006.01)
C10G 9/14    (2006.01)
F28F 1/14    (2006.01)

(52) U.S. Cl. .................... 585/652; 208/132; 165/184
(58) Field of Classification Search ................ 585/652; 208/132; 165/184
See application file for complete search history.

(56) References Cited

U.S. PATENT DOCUMENTS 5,950,718 A    9/1999    Sugitani et al. ............. 165/133

FOREIGN PATENT DOCUMENTS

| CN | 1121996 A | 5/1996 |
|---|---|---|
| JP | 61-006595 | 1/1986 |
| JP | 61-289293 | 12/1986 |
| JP | 06-039463 | 2/1994 |
| JP | 08-178574 | 7/1996 |
| JP | 08-303905 | 11/1996 |
| JP | 9-243283 | 9/1997 |
| JP | 10-24337 | 1/1998 |
| JP | 2000-274983 | 10/2000 |
| JP | 2001-208495 | 8/2001 |
| JP | 2002-005588 | 1/2002 |
| JP | 2002-107081 | 4/2002 |

OTHER PUBLICATIONS

Chinese Office Action dated Jun. 16, 2006 with its English translation.
Japanese Office Action dated Feb. 5, 2008 in Japanese.
Japanese Office Action dated Jul. 15, 2008 with partial English translation.

*Primary Examiner*—In Suk Bullock
(74) *Attorney, Agent, or Firm*—Kratz, Quintos & Hanson, LLP

(57) ABSTRACT

A cracking tube (50) for use in thermal cracking furnaces for producing ethylene or the like has fins (1) formed on an inner surface thereof and inclined with respect to an axis of the tube for stirring a fluid inside the tube. The fins are arranged discretely on one or a plurality of helical loci, and the tube inner surface has regions ($Z_B$) wherein no fins are present over the entire axial length of the tube from one axial end of the tube to the other axial end thereof.

3 Claims, 8 Drawing Sheets

CRACKING TUBE HAVING HELICAL FINS

This application is a divisional application of and claims priority from U.S. patent application Ser. No. 10/534,016, filed on May 5, 2005 now abandoned, which is a continuation of International Application PCT/JP03/14403, filed Nov. 12, 2003, and which claims priority to Japan Patent Application No. 2002-332257, filed Nov. 15, 2002. The contents of the prior applications are herein incorporated by reference in their entireties.

TECHNICAL FIELD

The present invention relates to cracking tubes for use in thermal cracking reactors for producing ethylene or the like, and more particularly to a cracking tube which is provided on the inner surface thereof with fins for stirring the fluid therein and which is adapted to suppress pressure losses to the greatest possible extent while effectively promoting heat transfer to the fluid therein.

BACKGROUND ART

Olefins such as ethylene, propylene or the like are produced by thermally cracking material gases of hydrocarbons (naphtha, natural gas, ethane, etc.). The thermal cracking reaction is conducted by introducing the hydrocarbon material gas and steam into a cracking coil disposed within a heating furnace supplied with heat from outside, and heating the mixture to a reaction temperature range while the mixture flows through the coil at a high velocity.

Typically, the cracking coil comprises a plurality of (straight) tubes which are connected into a zigzag assembly by bends.

To conduct the thermal cracking reaction efficiently, it is important to heat the fluid flowing inside the coil at a high velocity to the reaction temperature range radially inward to the central portion of the tube channel within a short period of time and to avoid heating at a high temperature to the greatest possible extent. If the gas is heated at a high temperature over a prolonged period of time, lighter fractions of hydrocarbons (methane, free carbons, etc.) will be produced in excessive amounts or the product of cracking will undergo, for example, a polycondensation reaction to reduce the yield of the desired product. Promoted coking (deposition of free carbon on the tube inner wall) will also result to lower the coefficient of heat transfer, giving rise to a need to perform decoking frequently.

Accordingly it is practice to provide fins on the tube inner surface of the cracking coil as elements for stirring the fluid within the tubes. The fluid flowing at a high velocity produces turbulence by being stirred by the fins, and can be heated to a higher temperature rapidly. As a result, the reaction is completed within a shortened period of time, while production of lighter fractions due to excessive cracking is avoided. Furthermore, an improvement in the coefficient of heat transfer of the tubes makes it possible to lower the temperature of the tubes, producing an effect to improve the serviceable life of the tubes.

FIGS. 12 to 14 show in development proposed examples of fins on cracking tubes (JP-A No. 1997-241781).

FIG. 12 shows fins 1 continuously extending helically at a constant angle of inclination with the tube axis.

FIG. 13 corresponds to the continuous helical fins of FIG. 12 as formed discretely. Fins 1 and nonfin portions 2 on helical loci are in a staggered arrangement wherein the fins are replaced by nonfin portions every turn of helix.

These examples have a great effect to stir the fluid within the tubes and are highly efficient in heat transfer to the fluid within the tubes, whereas the internal pressure of the fluid inside the tubes builds up owing to a great pressure loss of the fluid, entailing the drawback that the cracking operation produces ethylene, propylene or the like in a lower yield.

FIG. 14 shows fins 1 and nonfin portions 2 arranged alternately on a plurality of lines parallel to the tube axis. However, the fins positioned in parallel to the tube axis fail to produce a sufficient effect to stir the fluid inside the tubes and to achieve the desired heat transfer performance.

In view of the above problems, an object of the present invention is to suppress pressure losses to the greatest possible extent while maintaining an effect to promote heat transfer to the fluid within the tube.

SUMMARY OF THE INVENTION

To fulfill the above object, the present invention provides a cracking tube which has fins formed on an inner surface thereof and inclined with respect to an axis of the tube for stirring a fluid inside the tube, the fins being discretely arranged on one or a plurality of helical loci, the tube inner surface having regions wherein no fins are present over the entire axial length of the tube from one axial end of the tube to the other axial end thereof.

The tube of this construction is adapted to minimize the pressure loss of the fluid inside the tube while permitting the helical fins to transfer heat to the inside fluid with a high efficiency.

BEST MODE OF CARRYING OUT THE INVENTION

The cracking tube of the present invention will be described below in detail with reference to the illustrated embodiments.

Figure 1:
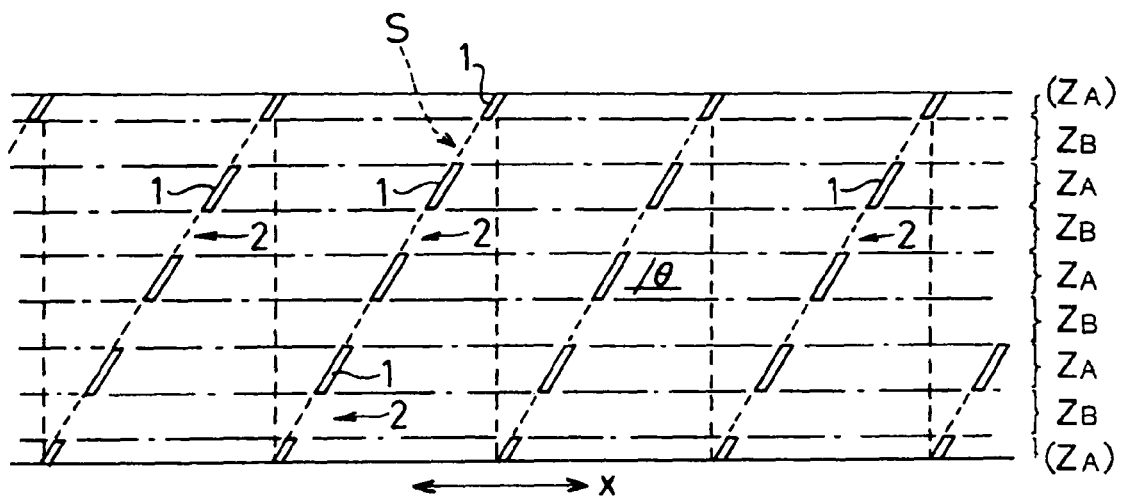
FIG. 1 is a development of the inner surface of a cracking tube of the invention for illustrating an embodiment of arrangement pattern of fins formed on the tube inner surface.

FIG. 1 is a development of the inner surface of a tube showing an embodiment of arrangement of helical fins according to the present invention.

Fins 1 are formed discretely along a helical locus which is positioned at a predetermined angle of inclination θ with respect to the axial direction x of the tube. The helical locus is indicated by slanting dotted lines, and connections of the helix are indicated by vertical dotted lines. Horizontal chain lines show regions $Z_A$ wherein fins are arranged in the axial direction, and regions $Z_B$ of nonfin portions 2 wherein no fins are present.

In the embodiment of FIG. 1, four fins are arranged along every turn of helix. The corresponding fins 1, as well as the corresponding nonfin portions 2, on helical lines representing respective turns of helix are arranged in a direction parallel to the tube axis.

FIGS. 2 to 5 are developments of the inner surfaces of tubes showing other embodiments of arrangements of helical fins according to the invention.

Figure 2:
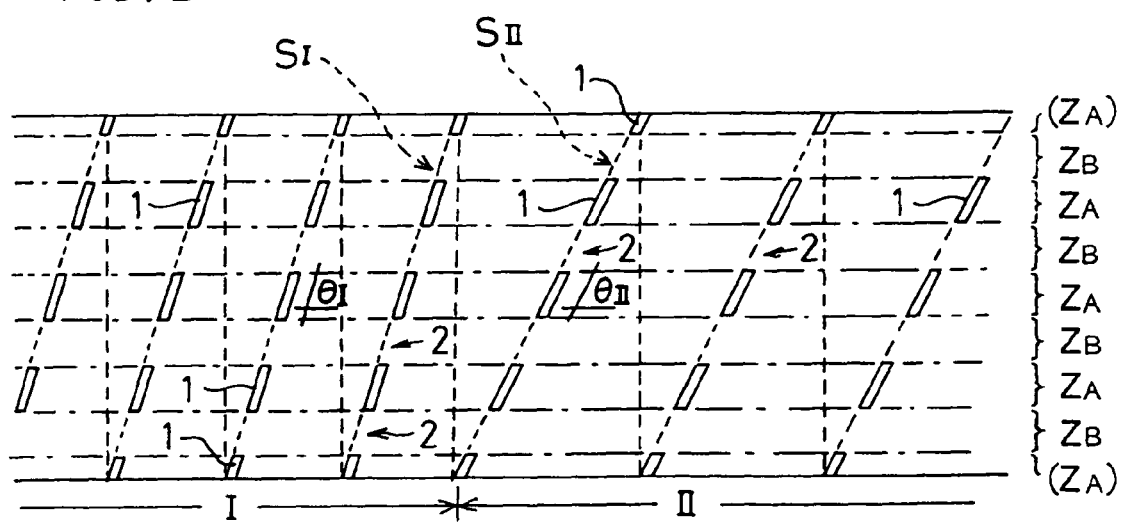
FIG. 2 is a development of the inner surface of a cracking tube of the invention for illustrating another embodiment of arrangement pattern of fins formed on the tube inner surface.

FIG. 2 shows helical fins formed along continuous helical loci which are different in the angle of inclination θ. The angle of inclination θ I of the helix in a region I of the tube channel is larger than the angle of inclination θ II of the helix in a region II thereof. The fins 1 and nonfin portions 2 are arranged within the respective regions $Z_A$ and $Z_B$ which are parallel to the tube axis.

Figure 3:
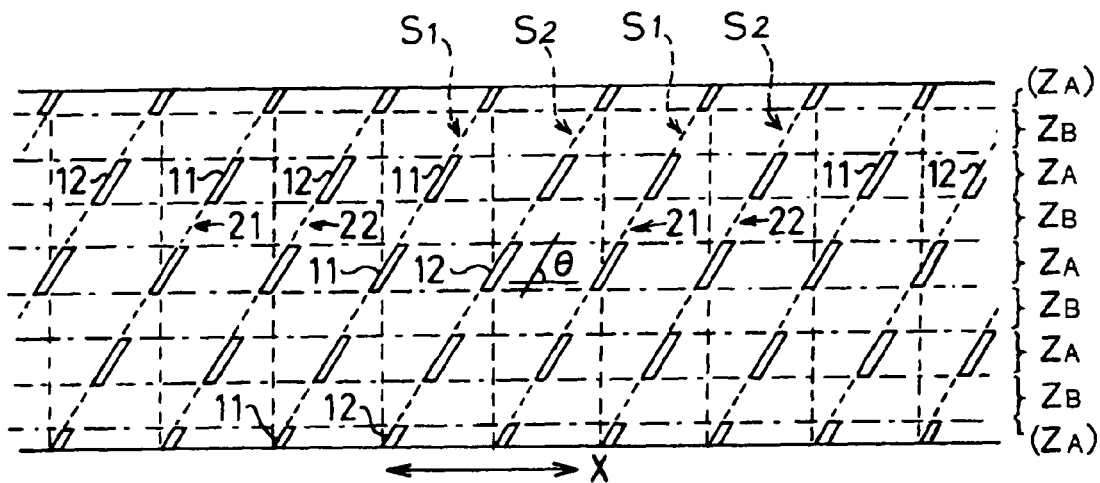
FIG. 3 is a development of the inner surface of a cracking tube of the invention for illustrating another embodiment of arrangement pattern of fins formed on the tube inner surface.

FIG. 3 shows an embodiment wherein two helical loci are provided. Fins are formed discretely at the same angle of inclination θ along respective helical loci S1 and S2. Fins 11 and nonfin portions 21 are formed on the helical locus S1, fins 12 and nonfin portions 22 are formed on the helical locus S2, the fins 11, 12 are arranged within regions $Z_A$, and the nonfin portions 21, 22 are arranged within regions $Z_B$.

Figure 4:
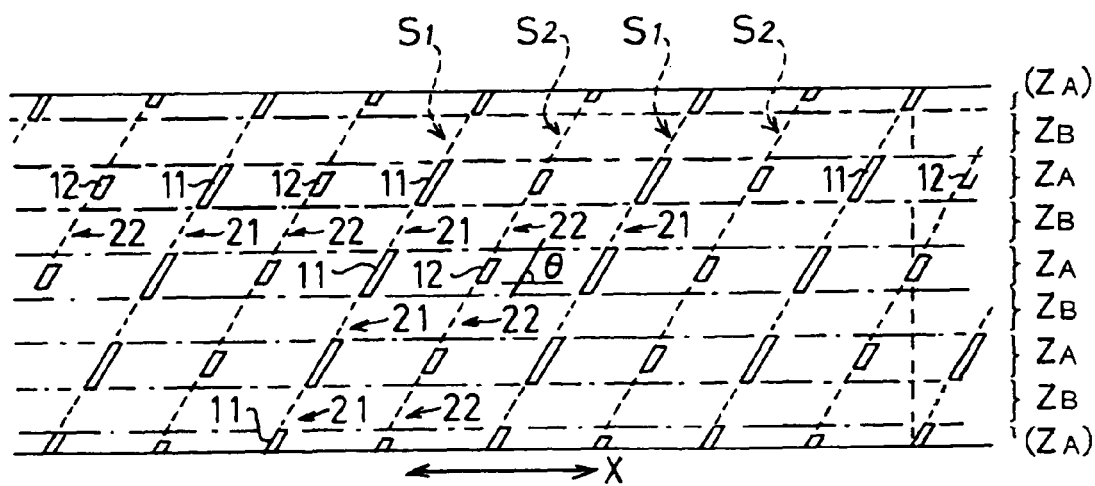
FIG. 4 is a development of the inner surface of a cracking tube of the invention for illustrating another embodiment of arrangement pattern of fins formed on the tube inner surface.

FIG. 4 shows an embodiment wherein helical fins are formed along two helical loci S1 and S2, and fins along the locus S1 are different from those along the locus S2 in size.

The fins 11 along the helical locus S1 are longer than the fins 12 along the helical locus S2. The fins 11, 12 are arranged within regions $Z_A$, and all or some of nonfin portions 21, 22 are arranged within regions $Z_B$.

Figure 5:
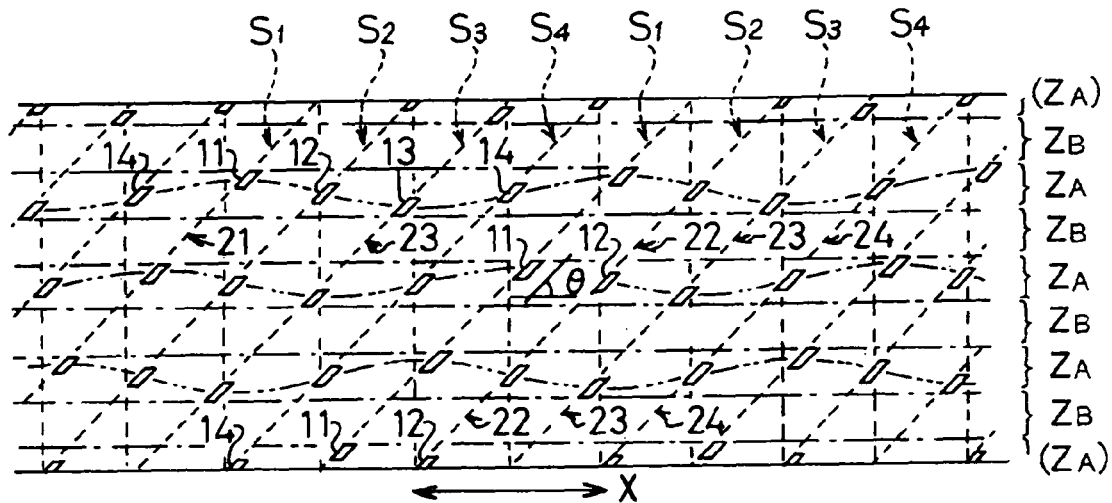
FIG. 5 is a development of the inner surface of a cracking tube of the invention for illustrating another embodiment of arrangement pattern of fins formed on the tube inner surface.

FIG. 5 shows an embodiment wherein helical fins are formed along four helical loci S1 to S4, and fins 11 to 14 along the respective helical loci S1 to S4 are arranged at slightly varying intervals circumferentially of the tube. The group of fins 11 to 14 on the respective four helical loci S1 to S4 are arranged within a region $Z_A$, and a group of nonfin portions 21 to 24 on these loci S1 to S4 are arranged within a region $Z_B$. These fins 11 to 14 within the region $Z_A$ are arranged along a wave (indicated in a chain line).

Thus, according to all the embodiments of FIGS. 2 to 5, the tube inner surface has regions $Z_B$ wherein no fins are present over the entire axial length of the tube from one axial end of the tube to the other axial end thereof.

Figure 6:
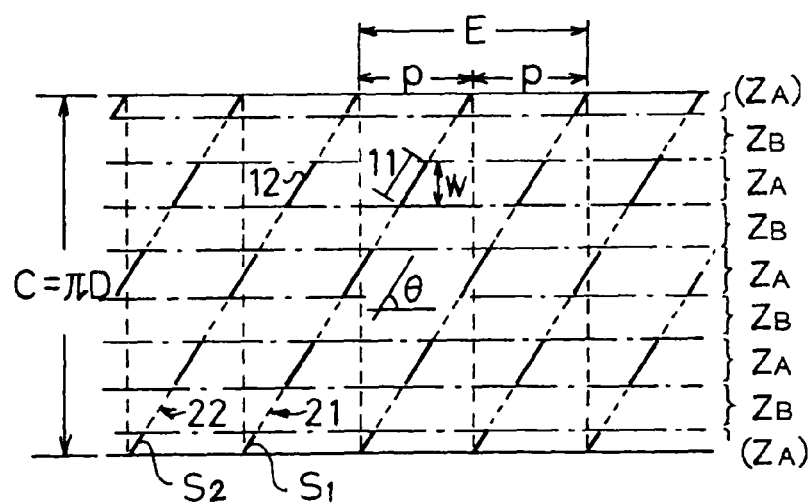
FIG. 6 is a diagram for illustrating the arrangement of fins shown in FIG. 3.

FIG. 6 is a diagram for illustrating the arrangement of fins shown in FIG. 3. Indicated at θ is the angle of inclination of the helical fins, and at p is the fin pitch that is the center-to-center distance between corresponding fins on the adjacent helical lines in the direction of tube axis. These values are determined suitably according to the inside diameter D of the tube.

In the case of a tube having an inside diameter D of about 30 to 150 mm, for example, the angle of inclination θ can be about 15 to about 85 degrees, and the pitch p, about 20 to 400 mm. The pitch p is increased or decreased for adjustment depending on the angle of inclination θ of the helix and the number N of helixes (p=E/N wherein E is helix lead).

The height H (the height of projection from the tube inner surface) of the fins is, for example, about one-thirtieth to one-tenth of the inside diameter of the tube. The length L of the fins is, for example, about 5 to 100 mm, and is determined, for example, according to the inside diameter D of the tube and the number of divided fins along every turn of helical locus.

Figure 7:
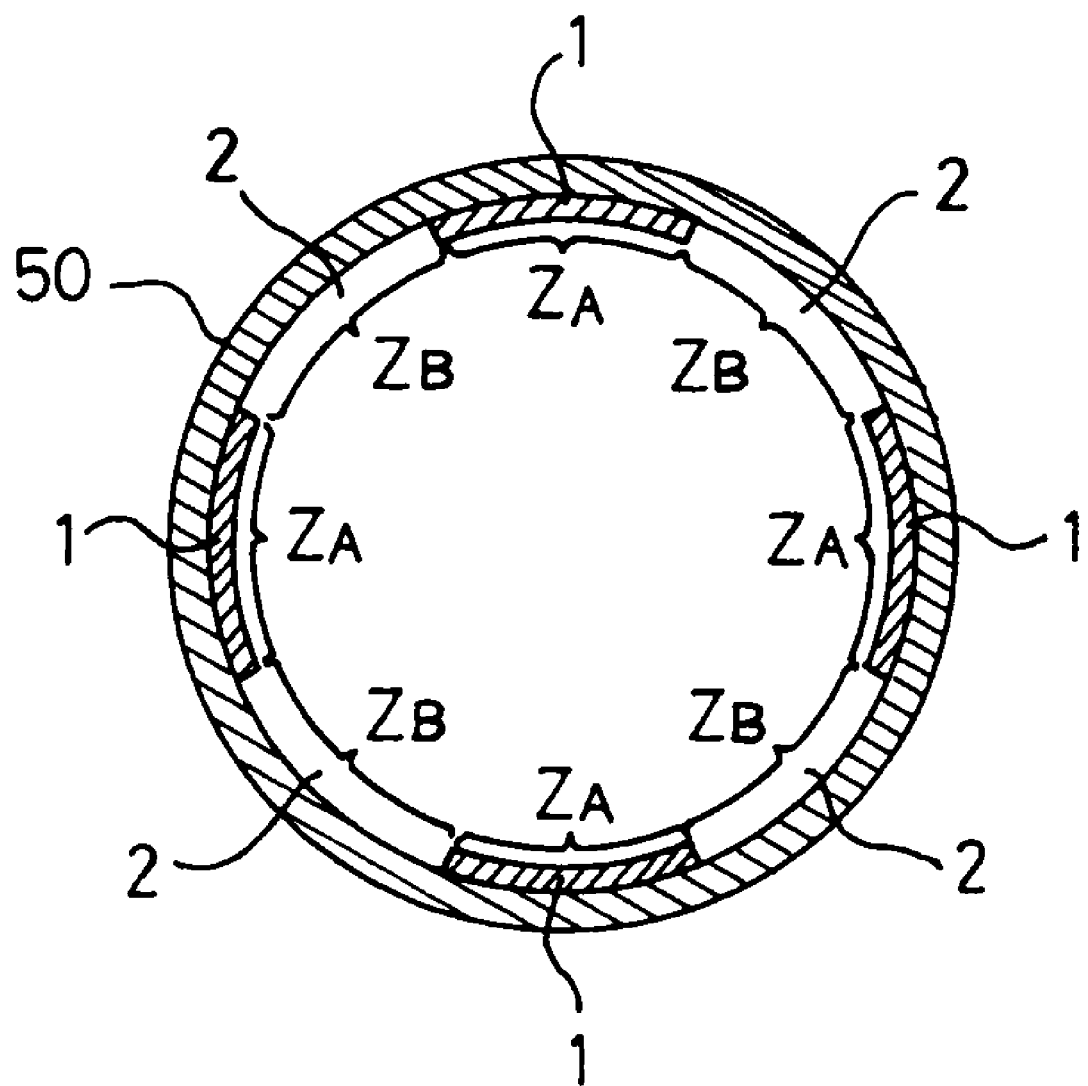
FIG. 7 is a view in cross section and showing the tube of the embodiment shown in FIG. 1.

FIG. 7 is a sectional view of helical fins in a plane orthogonal to the axis of the tube, and shows an embodiment wherein four fins are arranged on one turn of helical line. Suppose the fin has a circular arc length (as projected on a plane) w and the number of fins on one turn of helical line is n. The total circular arc length TW of the fins is then TW=w ×n.

Incidentally, the proportion of the total circular arc length TW of the fins to the circumferential length C (C=πD) of the tube inner surface, namely, R (R=TW/C), is preferably about 0.3 to 0.8 in order to ensure a minimized pressure loss while permitting the helical fins to promote heat transfer to the fluid inside the tube. If this value is too small, the effect to promote heat transfer will be lower, whereas if the value is excessively great, an excessive pressure loss will result.

Figure 8:
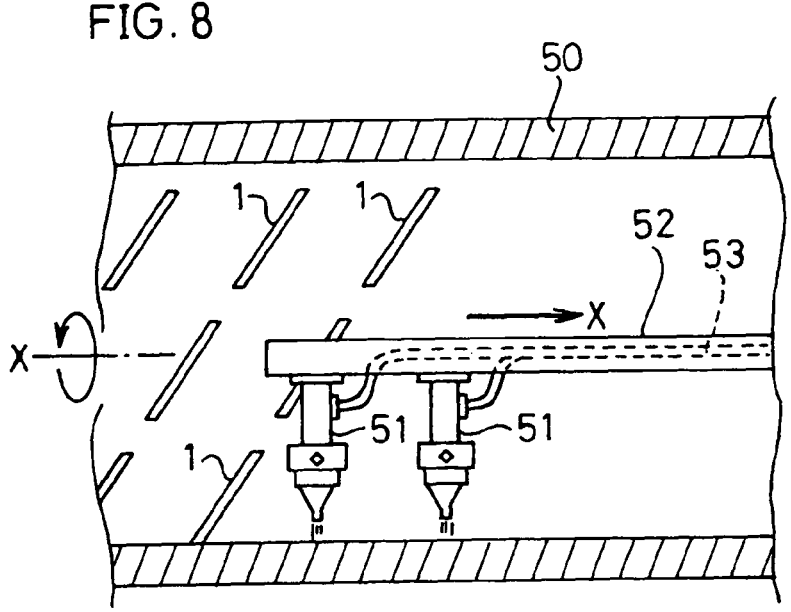
FIG. 8 is a diagram for illustrating an overlaying method of forming helical fins in the form of overlaid beads.

The helical fins can be efficiently formed as beads by an overlaying method such as plasma powder welding (PTA welding). FIG. 8 shows an example of welding operation.

A tube 50 is horizontally supported by a rotary drive apparatus (not shown) and rotatable about its axis x. A welding torch 51 is fixed to a support arm 52, which is held parallel to the tube axis and is movable forward or rearward axially of the tube.

A powder (material for overlaying) is supplied by a pipe 53 to the welding torch 51, which forms beads on the tube inner surface. Plasma welding is performed intermittently by the rotation of the tube 50 and the horizontal movement (in the direction of the tube axis) of the welding torch 51 to form helical fins comprising beads formed by overlaying.

In the case where two welding torches 51 are installed as illustrated, fins are formed along two helical loci.

The number of helixes of fins to be formed, the angle of inclination θ, pitch p, the number and width (circular arc length of projected image in FIG. 6) of fin regions $Z_A$, etc. are adjustable suitably by varying the speed of rotation of the tube 50, the number of welding torches 51 installed, the speed of horizontal movement thereof, the cycle of intermittent application of the plasma arc, etc.

Helical fins are arranged over the entire length of tube channel from the inlet end of the tube to the outlet end thereof, or at suitable portion or portions of the channel, for example, in at least one of a region in the vicinity of inlet end of the channel, intermediate region thereof and a region in the vicinity of the outlet end.

The material for forming the helical fins is the same kind of heat-resistant alloy as the tube, such as 25Cr—Ni(SCH22), 25Cr-35Ni(SCH24) or Incoloy(Trademark). Also suitably usable are other heat-resistant alloys which are serviceable in the environment wherein the tube is to be used.

The present invention will be further described with reference to specific examples.

EXAMPLE 1

Test Tubes T1 to T5 were prepared and checked for film heat transfer coefficient h (W/m$^2$/K) and pressure loss dP (Pa).

T1 is according to the invention, and T2 to T5 are comparative examples. Table 1 shows the particulars about these test tubes.

TABLE 1

Figure 12:
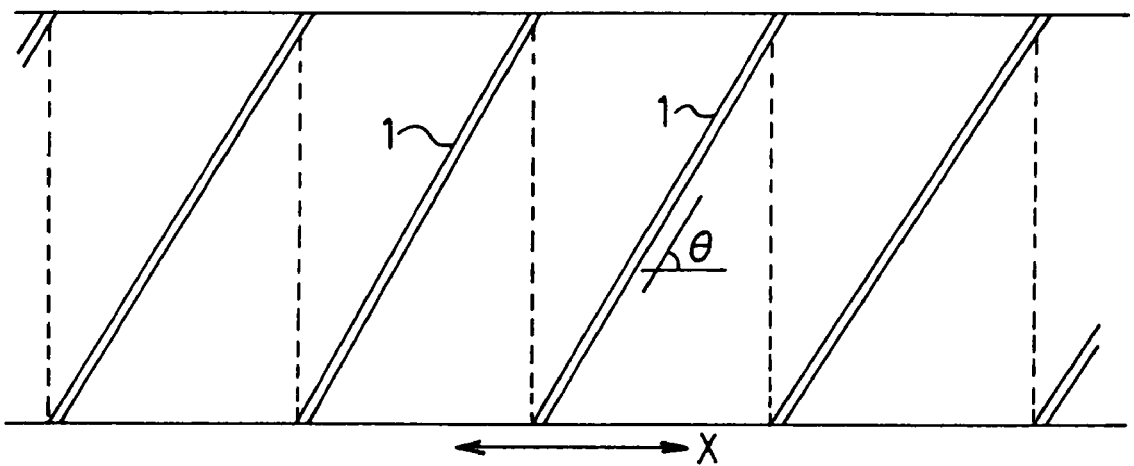
FIG. 12 is a development of the inner surface of a conventional cracking tube for illustrating a pattern of fin formed on the tube inner surface.
Figure 13:
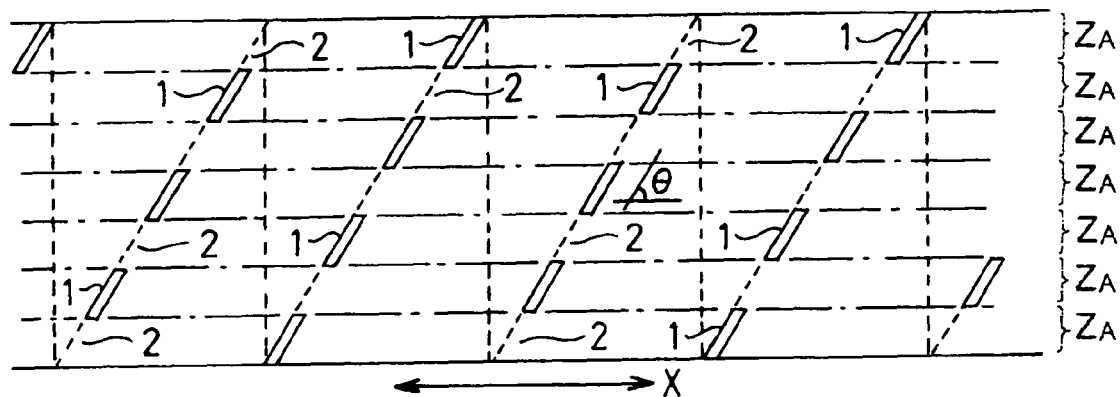
FIG. 13 is a development of the inner surface of a conventional cracking tube for illustrating another arrangement pattern of fins formed on the tube inner surface.
Figure 14:
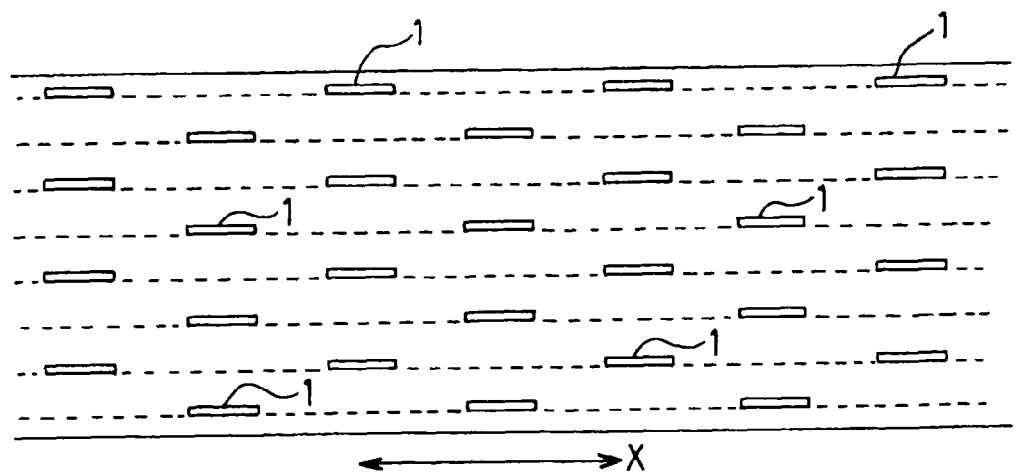
FIG. 14 is a development of the inner surface of a conventional cracking tube for illustrating another arrangement pattern of fins formed on the tube inner surface.

| Test Tubes | | | Fin Specifications | | | | |
|---|---|---|---|---|---|---|---|
| No. | I.D. | Circumferential length of inner surface | Drawing | Shape | Height | Thickness | Circular arc length as projected |
| T1 | 42 mm | 132 mm | FIG. 1 | Discrete, helical | 2.2 mm | 8 mm | 16.5 mm |
| T2 | 42 mm | 132 mm | FIG. 12 | Continuous, helical | 2.2 mm | 8 mm | 18.9 mm |
| T3 | 42 mm | 132 mm | FIG. 13 | Discrete, helical (staggered) | 2.2 mm | 8 mm | 18.9 mm |
| T4 | 42 mm | 132 mm | FIG. 14 | Parallel to tube axis | 2.2 mm | 8 mm | 18.9 mm |
| T5 | 42 mm | 132 mm | None | No fin | — | — | — |

| Test Tubes No. | Fin Specifications | | | | | | |
|---|---|---|---|---|---|---|---|
| | Number of helixes | Number per turn of helix | Number of rows In circumferential direction | Angle of inclination | Pitch | Length ratio R * | Note |
| T1 | 1 | 4 | — | 60 deg | 76 mm | 0.5 | Invention |
| T2 | 1 | — | — | 60 deg | 76 mm | 1.0 | Comp. ex. |
| T3 | 1 | 4 and 3 alternating | — | 60 deg | 76 mm | 1.0 | Comp. ex. |
| T4 | — | — | 8 | — | — | 0.5 ** | Comp. ex. |
| T5 | — | — | — | — | — | — | Comp. ex. |

(Note)
* Circular arc length ratio R = (sum of circular arc lengths of fins along every turn of helix, as projected on a plane orthogonal to tube axis)/(circumferential length of tube inner surface)
** The circular arc length ratio for T4 was determined as (sum of thicknesses of fins)/(circumferential length of tube inner surface).

Experimental conditions are as follows.

Test fluid: air

Fluid temperature (inlet end): room temperature

Reynolds number: 20,000-60,000

Pressure loss measuring section: 1000 mm

Figure 9:
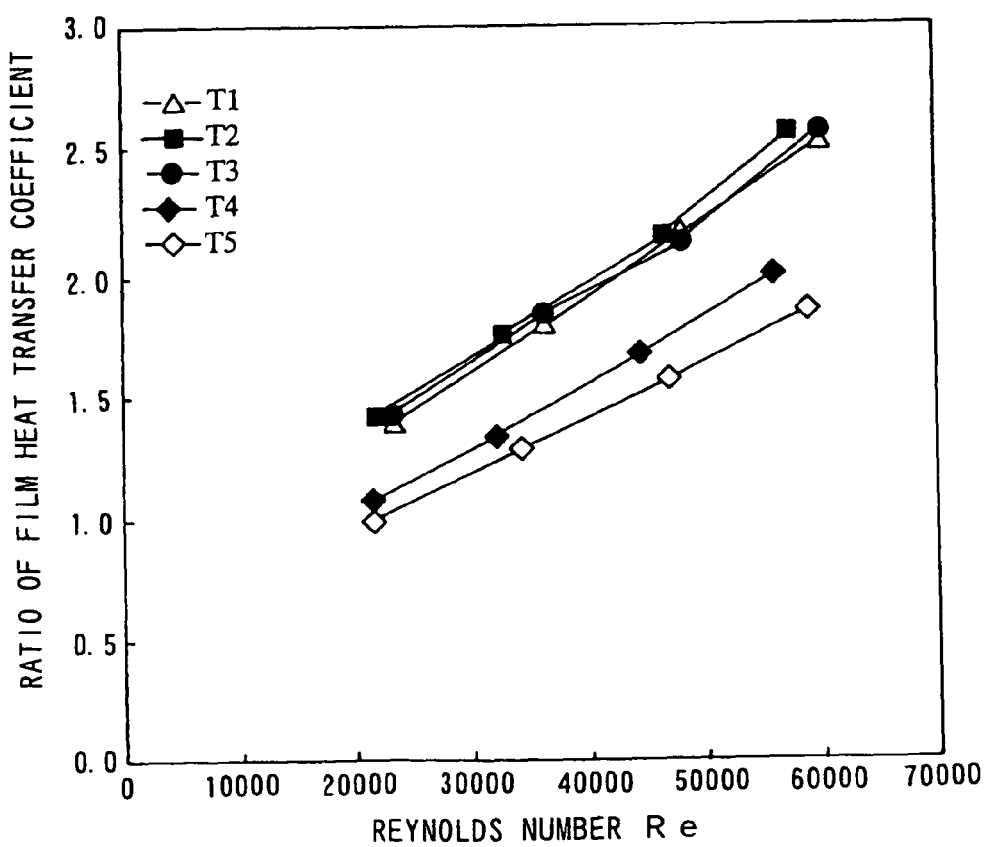
FIG. 9 is a graph showing heat transfer characteristics of test tubes determined by the experiment.
Figure 10:
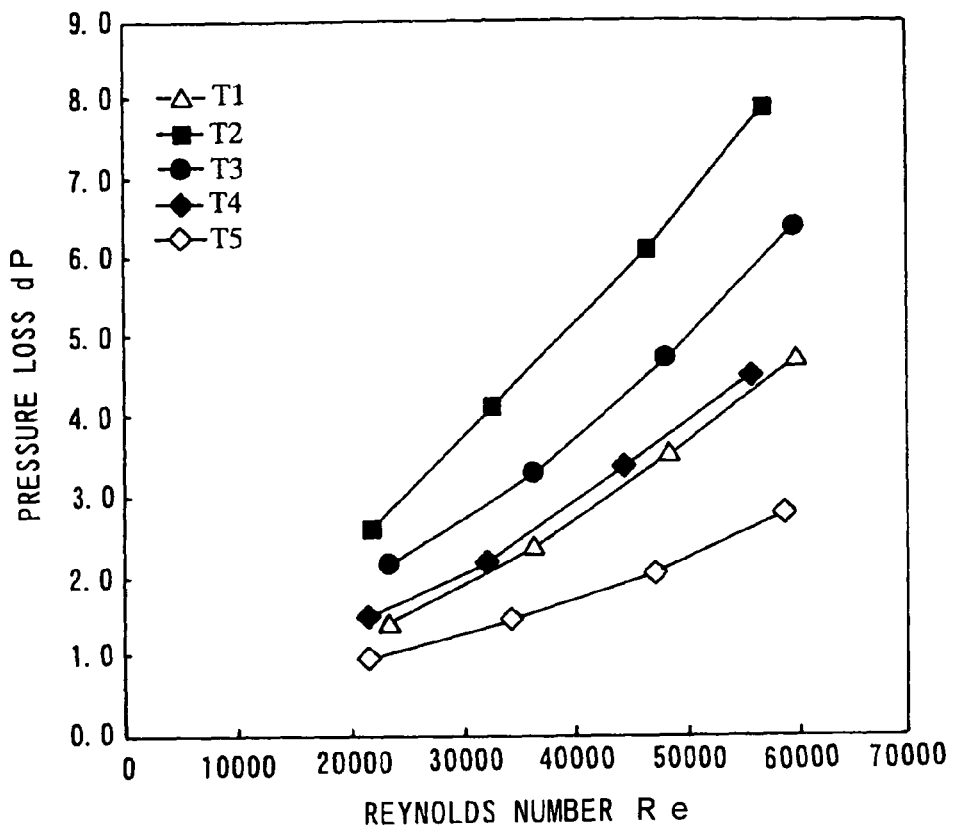
FIG. 10 is a graph showing pressure loss characteristics of the test tubes determined by the experiment.

The results of measurement are shown in FIG. 9 (film heat transfer coefficient h) and FIG. 10 (pressure loss dP). Each measurement is shown relative to the value of Test Tube T5 at a Reynolds number of 20,000 which value is taken as 1.0 (reference value).

FIGS. 9 and 10 reveal that Test Tube T1 of the invention is comparable to Test Tube T2 having a continuous helical fin and Test Tube T3 having discrete helical fins in heat transfer characteristics and is comparable to Test Tube T4 in pressure loss.

However, Test Tubes T2 and T3 are greater than Test Tube 1 in pressure loss and result in a lower yield as will be described later.

On the other hand, Test Tube T4 is inferior to Test Tube T1 in heat transfer characteristics and therefore has the problem of permitting coking in addition to a lower yield.

Test Tube T5 is a smooth-surfaced tube having no fins and accordingly superior to Test Tube T1 of the invention with respect to pressure loss, but is inferior in heat transfer characteristics and involves the problem of yield and coking like Test Tube T4.

In contrast, Test Tube T1 of the invention is adapted to ensure a minimized pressure loss while maintaining the desired heat transfer characteristics.

EXAMPLE 2

Figure 11:
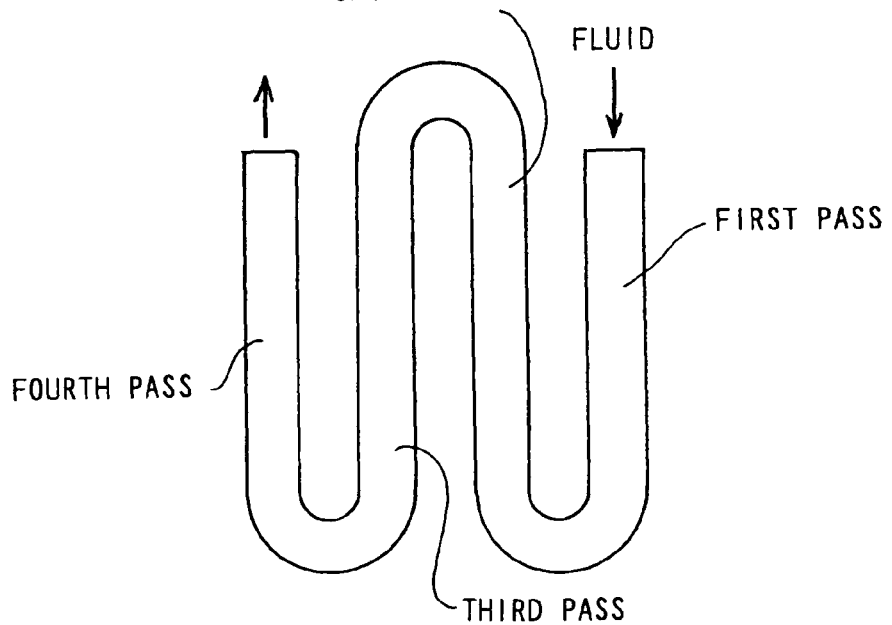
FIG. 11 is a diagram for generally illustrating the configuration of a test coil.

Next, a thermal fluid analysis was conducted using a W-shaped coil shown in FIG. 11 and simulating the conditions under which reactors are used for producing ethylene to determine pressure loss of the fluid inside the coil and yields of ethylene and propylene.

The coil shown in FIG. 11 includes tubes (straight tubular portions) which are 63.5 mm in inside diameter, 6.4 mm in wall thickness and 9.6 m in length and which provide a first pass, second pass, third pass and fourth pass, respectively, as arranged in this order from the upstream side downstream. Table 2 shows the construction of Test Tubes T6 to T9.

Test Tube T6 is according to the invention, and Test Tubes to T9 are comparative examples. As to the arrangement of fins on the tube (straight tubular portion), Test Tube T6 is the same as is shown in FIG. 1, T7 as is shown in FIG. 13, and as is shown in FIG. 12. T9 is an example which has no fins.

TABLE 2

| Structure of passes | Test Tubes | | | |
|---|---|---|---|---|
| | T6 (Invention) | T7 (Comp. ex.) | T8 (Comp. ex.) | T9 (Comp. ex.) |
| First pass | No fin | No fin | No fin | No fin |
| Second pass | No fin | No fin | No fin | No fin |
| Third pass | Fin A* | Fin B** | Fin C*** | No fin |
| Fourth pass | Fin A* | Fin B** | Fin C*** | No fin |

(Note)
*Fins A: Discrete helical fins (4 fins/turn of helix) in the arrangement of FIG. 1, 60 deg in angle of inclination, 3.5 mm in the height of fins, 115.2 mm in pitch.
**Fins B: Discrete helical fins in the arrangement of FIG. 13, 60 deg in angle of inclination, 3.5 mm in the height of fins, 115.2 mm in pitch.
***Fin C: Continuous helical fin extending as shown in FIG. 12, 60 deg in angle of inclination, 3.5 mm in the height of fin, 115.2 mm in pitch.

The analysis conditions are fluid pressure at the coil outlet of 1.98 kg/cm² (absolute pressure), coil inlet temperature of 600° C. and coil outlet temperature of 830° C. Naphtha was caused to flow through one coil at a flow rate of 840 kg/h, and steam at a flow rate of 420 kg/h.

Table 3 shows the temperature of the first to fourth passes of the coil.

Table 4 shows the results of analysis, i.e. the pressure and temperature at the coil inlet and outlet, pressure loss and ethylene and propylene yields.

TABLE 3

| Temperature at each pass of test tubes | Test tubes | | | |
|---|---|---|---|---|
| | T6 (Invention) | T7 (Comp. ex.) | T8 (Comp. ex.) | T9 (Comp. ex.) |
| First pass (° C.) | 849 | 847 | 846 | 860 |
| Second pass (° C.) | 870 | 868 | 867 | 881 |
| Third pass (° C.) | 880 | 879 | 877 | 906 |
| Fourth pass (° C.) | 915 | 914 | 913 | 936 |

TABLE 4

| | Test tubes | | | |
|---|---|---|---|---|
| | T6 (Invention) | T7 (Comp. ex.) | T8 (Comp. ex.) | T9 (Comp. ex.) |
| Coil inlet pressure (kg/cm²) * | 3.68 | 3.84 | 3.98 | 3.25 |
| Coil outlet pressure (kg/cm²) * | 1.98 | 1.98 | 1.98 | 1.98 |
| Pressure loss of fluid (kg/cm²) * | 1.70 | 1.86 | 2.00 | 1.27 |
| Coil inlet temperature (° C.) | 600 | 600 | 600 | 600 |
| Coil outlet temperature (° C.) | 830 | 830 | 830 | 830 |
| Ethylene yield (wt %) | 26.8 | 26.5 | 26.3 | 26.1 |
| Propylene yield (wt %) | 16.5 | 16.2 | 16.1 | 15.9 |

(Note)
* Absolute pressure

Table 3 reveals that T6 is comparable to T7 and T8 in tube temperature and about 20 C. lower than T9. This means that T6 to T8 are comparable in heat transfer efficiency and can be operated at a lower temperature.

Table 4 shows that T6 is smaller than T7 and T8 in pressure loss and excellent in ethylene and propylene yields. Although small in pressure loss, T9 is inferior in heat transfer efficiency and therefore lower in ethylene and propylene yields.

INDUSTRIAL APPLICABILITY

The arrangement of helical fins formed on the inner surface of the cracking tube of the invention enables the tube to minimize the pressure loss of the fluid inside the tube while permitting the tube to maintain high heat transfer characteristics due to the stirring action of fins. Accordingly the tube achieves improved ethylene and propylene yields, diminishes decoking work for the tube, has a prolonged life and is therefore useful as a cracking tube for thermal cracking furnaces for producing ethylene or the like.

The invention claimed is:

1. A process of producing olefins by thermal cracking reaction of hydrocarbon, the process comprising the steps of:

heating a cracking tube to a thermal cracking temperature range, the cracking tube having fluid stirring fins provided on an inner surface of the tube, and a pressure loss suppressing region having no fins in the axial direction of the tube;

introducing hydrocarbon material gas and steam into the cracking tube;

subjecting a mixture of the hydrocarbon material gas and the steam to a thermal cracking reaction process in the heated cracking tube;

the said thermal cracking reaction process comprising the steps of:

stirring the mixture to improve a heat transfer effect by use of the fluid stirring fins which comprises a plurality of discrete fins, each fin being of an elongated configuration, formed on an inner surface of a circular tube member and located on at least one helical locus with a longitudinal axis of the elongated configuration of each fin extending along the helical locus, to define a helical angle of 15 to 85 degrees with the axial direction of the tube member, said fin having a ratio of TW/C in the range of 0.3 to 0.8 wherein TW (TW =w×n wherein w is the circular arc length of the fin as projected on a plane orthogonal to the axis of the tube member, and n is the number of fins on one turn of the helical locus) is the sum of the circular arc length of fins, and C (C=πD wherein D is the inside diameter of the tube member) is the circumferential length of the tube inner surface; and minimizing the pressure loss of the mixture while maintaining said improved heat transfer effect by use of the pressure loss suppressing region Zb wherein no fins are present in parallel to the axial direction of the tube axis over an entire axial length of the tube.

2. The process according to claim 1, wherein the fins are weld beads formed by overlaying.

3. The process according to claim 1, wherein the olefins include ethylene and propylene.

* * * * *